United States Patent Office 3,332,996
Patented July 25, 1967

3,332,996
TRIFLUOROMETHYL-SUBSTITUTED SALICYLANILIDES
Werner Zerweck, Frankfurt am Main, and Otto Trösken and Karl Hintermeier, Frankfurt am Main, Fechenheim, Germany, assignors to Cassella Farbwerke Mainkur Aktiengesellschaft, Frankfurt am Main, Fechenheim, Germany, a company of Germany
No Drawing. Filed Mar. 23, 1962, Ser. No. 182,096
Claims priority, application Germany, Mar. 25, 1961, C 23,741
13 Claims. (Cl. 260—559)

The present invention relates to new salicylanilides that are distinguished by a superior bactericidal action.

More particularly, the present invention relates to salicylanilides containing at least two trifluoromethyl substituent radicals that have the general formula

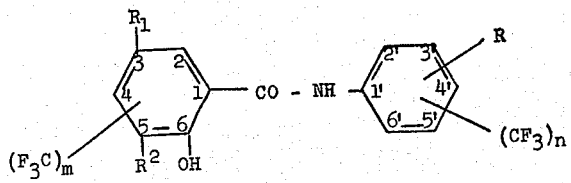

in which $R'$ represents a radical of the group consisting of hydrogen, chlorine, bromine and nitro, $R^2$ represents a radical of the group consisting of hydrogen, chlorine and bromine, $R$ represents a radical of the group consisting of hydrogen and chlorine, and $m$ and $n$ are integers from 0 to 2 whose sum is at least 2 and not more than 3.

Salicylanilides having bactericidal activity which contain at least 3 halogen substituents are disclosed in United States Patent No. 2,703,332. The activity of, for example, 3',4',5-trichlorosalicylanilide and the corresponding 4',5-dichloro-3'-trifluoromethylsalicylanilide against *Staphylococcus aureus* is disclosed in that patent.

We have found that salicylanilides having the above general formula containing at least two trifluoromethyl groups are considerably more effective as bactericides than the products disclosed in that patent and especially more effective than the compound described therein having only one trifluoromethyl substituent in its anilino radical. This difference in activity is not only in degree but also in kind as may be seen from a comparison of the bactericidal actions of the known compounds against *Staphylococcus aureus* and *Escherichia coli* and the bactericidal action of the new products of our invention. Whereas 3',4',5-trichlorosalicylanilide and 4',5-dichloro - 3' - trifluoromethylsalicylanilide disclosed in Patent No. 2,703,-332 have only a moderate action against *Staphylococcus aureus* and an insufficient action against *Escherichia coli*, the products of our invention generally possess a substantially greater activity against *Staphylococcus aureus* and a surprisingly great activity against *Escherichia coli*.

For preparing the new salicylanilides of the present invention, the methods for preparing prior known salicylanilides can be used such as that described for the preparation of salicyl-o-toluide, for example, by C. F. H. Allen and J. Van Allan in "Organic Synthesis," vol. 26, John Wiley & Sons, Inc., New York, 1946, pp. 92–94, by condensing salicylic acids which are substituted by trifluoromethyl groups or their functional derivatives, such as esters and halides, with arylamines bearing, if desired, trifluoromethyl groups and by selecting the compounds in such a way that the resultant salicylanilides contain in the molecule at least two trifluoromethyl groups and possibly further substituents, especially halogen atoms and nitro groups.

Instead of salicylic acids there may also be employed acylated salicylic acids or their functional derivatives, which are condensed with the arylamines. The acyl radical may subsequently be split off in the conventional manner from the acyl-salicylanilide thus obtained.

When halides of salicylic acids are used for the production of the salicylanilides, it is not necessary to first produce these halides separately. The condensation may rather be carried out by heating the salicylic acids together with the arylamines in an inert organic solvent, such as monochlorobenzene, toluene, nitrobenzene, etc., while adding a stoichiometrically equivalent amount of an inorganic acid chloride, such as phosphorus trichloride or thionyl chloride ($SOCl_2$).

The salicylanilides according to our invention containing at least two trifluoromethyl groups are excellent disinfectants, especially when used for sanitation purposes. They may be employed as such in the control of bacterial infectious diseases of the skin, or when incorporated into the conventional washing agents, cleaning agents, detergents and cosmetics, they may also be employed in the disinfectant cleaning of objects of all kinds, such as textile materials, apparatus, equipment and containers in the beverage industry, milk cans, etc.

The following examples are given for the purpose of illustrating the present invention. Where not otherwise stated, parts are given as parts by weight and the temperatures are in degrees centigrade. The relationship of parts by weight to parts by volume is as that of kilograms to liters.

*Example 1*

248.5 parts of 5-chlorosalicylate together with 229 parts of 3,5-bis(trifluoromethyl)aniline are heated to 190–200° for 5 hours with stirring. Then the evolved phenol is distilled off at a subatmospheric pressure and the light yellow-colored residue is recrystallized from chlorobenzene.

The 5-chloro-3',5'-bis(trifluoromethyl)salicylanilide is thus obtained in a nearly quantitative yield in the form of coarse, colorless prisms having a melting point of 179–181°.

In an analogous manner, when using the relevant starting materials, there may be obtained:

3',5' - bis(trifluoromethyl)salicylanilide having a melting point of 199–200°,
5-bromo-3',5'-bis(trifluoromethyl)salicylanilide having a melting point of 201–202°,
3,5-dichloro-3',5' - bis(trifluoromethyl)salicylanilide having a melting point of 136–138°,
3,5 - dibromo-3',5'-bis(trifluoromethyl)salicylanilide having a melting point of 175–176°,
4',5 - dichloro-3',5'-bis(trifluoromethyl)salicylanilide having a melting point of 191–193°.

*Example 2*

206 parts of 4-trifluoromethylsalicyclic acid are stirred with 161 parts 3-trifluoromethylaniline and 1000 parts by volume of monochlorobenzene. This mixture is admixed at room temperature with 50 parts of phosphorus trichloride in 150 parts by volume of monochlorobenzene and heated under reflux for about 1 hour at the boil. Meanwhile the 4-trifluoromethylsalicylic acid dissolves gradually. After the evolution of hydrogen chloride has ceased, the hot chlorobenzene solution is poured off from the precipitate which consists of phosphorous acid and filtered.

The 3',4-bis(trifluoromethyl) salicylanilide thus formed crystallizes from the filtrate, on cooling, in a nearly quantitative yield. After crystallization from methyl ether of ethylene glycol (2 methoxyethanol) this compound is obtained in form of colorless crystals having a melting point of 174–175°.

In an analogous manner there may be obtained: 4',4-bis(trifluoromethyl) salicylanilide having the melting point of 202–203°, 3', 5',4-tris(trifluoromethyl) salicylanilide having a melting point of 187–188°, 2'-chloro-5',4-bis(trifluoromethyl) salicylanilide having a melting point of 138–140°, 4'-chloro-2',4-bis(trifluoromethyl) salicylanilide having a melting point of 181–183°, 5-nitro-3',5'-bis(trifluoromethyl) salicylanilide having a melting point of 234–235°.

The following table shows the outstanding bactericidal action of the compounds prepared according to the present invention as compared with 3',4',5-trichlorosalicylanilide and 4',5-dichloro-3'-trifluoromethylsalicylanilide against *Staphylococcus aureus* and *Escherichia coli*. The data represent the percent kill of organisms during a 10 minute exposure to equal amounts of the relevant compounds, as measured by plate count.

| Compound | Percentage kill | |
|---|---|---|
| | Staphylococcus aureus | Escherichia coli |
| Cl–C₆H₃(OH)–CO.NH–C₆H₃(CF₃)₂ | 38 | 89 |
| Br–C₆H₃(OH)–CO.NH–C₆H₃(CF₃)₂ | 52 | 86 |
| F₃C–C₆H₃(OH)–CO.NH–C₆H₄(CF₃) | 21 | 70 |
| F₃C–C₆H₃(OH)–CO.NH–C₆H₃(CF₃)₂ | 45 | 80 |
| Cl–C₆H₃(OH)–CO.NH–C₆H₃(Cl)(CF₃) | 4 | 10 |
| Cl–C₆H₃(OH)–CO.NH–C₆H₃Cl₂ | 24 | 8 |

Testing of the compounds with respect to their bactericidal action is carried out as follows: A 24-hour culture of the test organism (*Staphylococcus aureus* or *Escherichia coli*) is diluted to a concentration such as to produce an inoculum each milliliter of which has a bacterial count of 50,000,000 organisms. One-tenth of a milliliter of this inoculum is then added to a tube of broth containing the test compound at a concentration of 10 gammas (micrograms) per milliliter. The inoculated tube is then incubated at 37° for 10 minutes. At the end of this time 0.1 milliliters of this mixture is placed in a tube containing 9.9 milliliters of 0.1% peptone water, the tube shaken thoroughly and then specimens consisting of 0.1 milliliter are withdrawn and transferred to sterile Petri dishes. A 20-milliliter portion of liquid agar culture medium is added to each of the plates, mixed thoroughly and allowed to solidify and subsequently incubated for 48 hours at 37°. Then enumerations are made and the percent survival calculated in consideration of the appropriate controls containing no bactericidal substance.

It will be understood that this invention is susceptible to further modification and, accordingly, it is desired to comprehend such modifications within this inventon as may fall within the scope of the appended claims.

We claim:

1. A poly(trifluoromethyl)-substituted salicylanilide having the formula

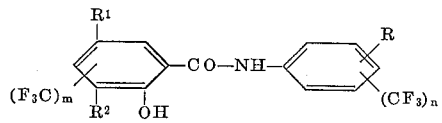

in which
R is a radical of the group consisting of hydrogen and chlorine,
$R^1$ is a radical of the group consisting of hydrogen, chlorine, bromine, and nitro,
$R^2$ is a radical of the group consisting of hydrogen, chlorine, and bromine,
and $m$ and $n$ are integers from 0 to 2 whose sum is at least 2 and not more than 3.

2. A trifluoromethyl-substituted salicylanilide of the formula

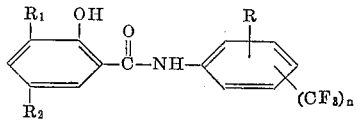

wherein R is a member selected from the group consisting of hydrogen and chlorine; $R_1$ is a member selected from the group consisting of hydrogen and bromine; $R_2$ is a member selected from the group consisting of hydrogen, chlorine, bromine and nitro, and $n$ is 2.

3. 5-chloro-3',5'-bis(trifluoromethyl)salicylanilide.
4. 3',5'-bis(trifluoromethyl)salicylanilide.
5. 5-bromo-3',5'-bis(trifluoromethyl)salicylanilide.
6. 3,5-dichloro-3',5'-bis(trifluoromethyl)salicylanilide.
7. 3,5-dibromo-3',5'-bis(trifluoromethyl)salicylanilide.
8. 3',4-bis(trifluoromethyl)salicylanilide.
9. 4',4-bis(trifluoromethyl)salicylanilide.
10. 3',5',4-tris(trifluoromethyl)salicylanilide.
11. 2'-chloro-5',4-bis(trifluoromethyl)salicylanilide.
12. 4'-chloro-2',4-bis(trifluoromethyl)salicylanilide.
13. 5-nitro-3',5'-bis(trifluoromethyl)salicylanilide.

References Cited

UNITED STATES PATENTS

| | | | |
|---|---|---|---|
| 2,764,614 | 9/1956 | Meyer | 260—559 |
| 2,822,391 | 2/1958 | Suter et al. | 260—559 |
| 2,967,194 | 1/1961 | Hauptschein | 260—559 XR |
| 3,049,474 | 8/1962 | Hepworth | 167—65 |
| 3,057,777 | 10/1962 | Van Heyningen | 167—65 |

OTHER REFERENCES

Chemical Abstracts, Sixth Collective Index, vol. 51–55, 1957–1961 subjects A–bi, p. 1396S (1964).

JOHN D. RANDOLPH, *Primary Examiner.*

IRVING MARCUS, NICHOLAS S. RIZZO, WALTER A. MODANCE, *Examiners.*

R. L. PRICE, N. TROUSOF, *Assistant Examiners.*